UNITED STATES PATENT OFFICE.

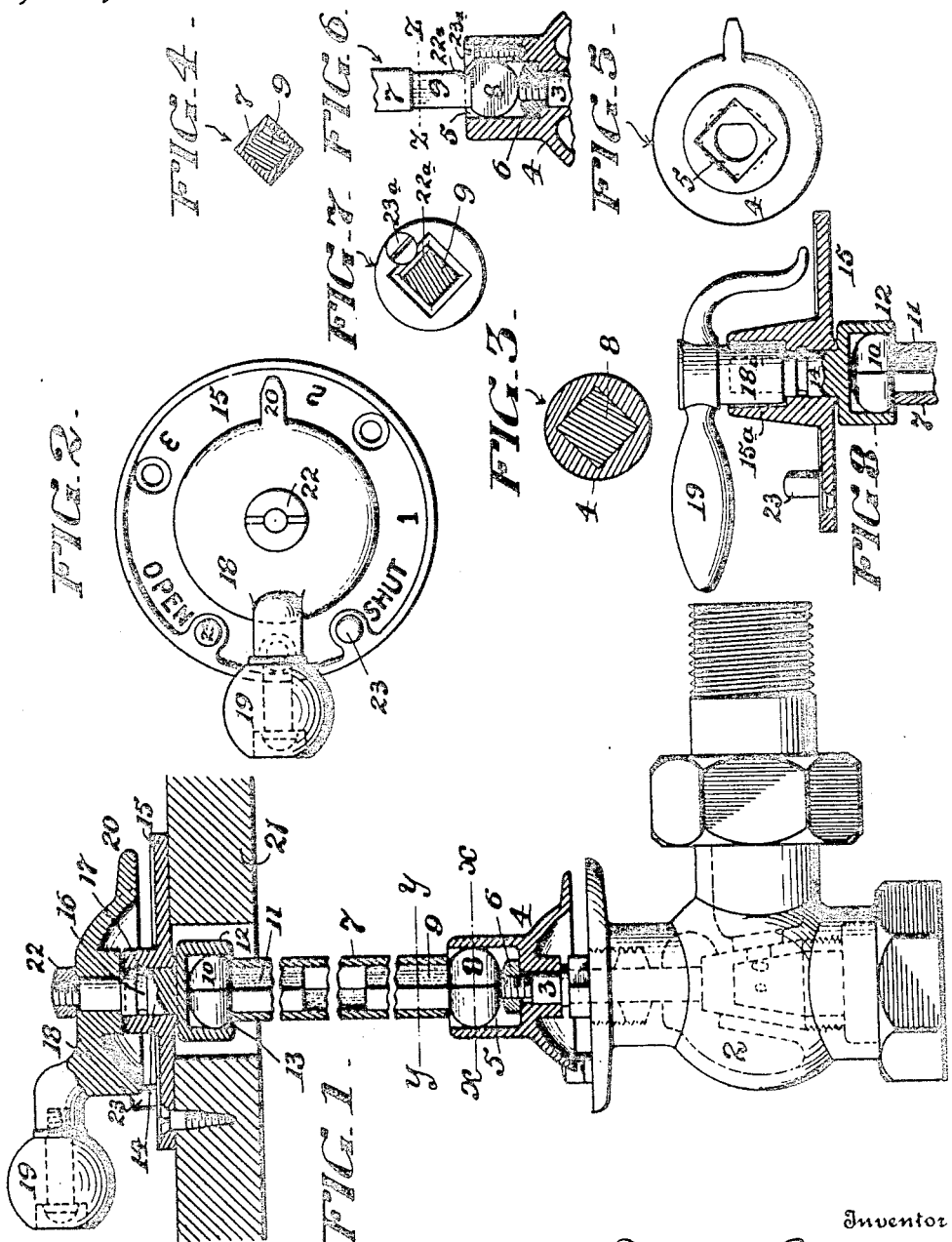

JOHN A. SERRELL, OF NORTH PLAINFIELD, NEW JERSEY.

POWER-TRANSMITTING DEVICE.

1,111,865.  Specification of Letters Patent.  Patented Sept. 29, 1914.

Application filed January 4, 1912. Serial No. 669,454.

*To all whom it may concern:*

Be it known that I, JOHN A. SERRELL, a citizen of the United States, and a resident of North Plainfield, Somerset county, State of New Jersey, have invented an Improvement in Power-Transmitting Devices, of which the following is a specification.

My invention has reference to power transmitting devices and consists of certain improvements which are fully set forth in the following specification and shown in the accompanying drawings which form a part thereof.

The object of my invention is to provide a construction of universal joint extension stems suitable for transmitting rotary motion from a driving part to which power is applied to a driven part from which the power transmitted is to be utilized, whether the invention is adapted to transmission of large or small power.

My invention consists of a rotary driving part and a rotary driven part, combined with connecting power transmitting devices comprising a stem, the ends of which are provided with heads having their outer surfaces polygonal in cross section and curved in longitudinal section, and portions having sockets polygonal in cross section in which the heads of the stem are respectively arranged, said socket portions being respectively connected with the driving and driven parts.

My invention also consists in the above construction when the universal joint connecting stem is formed for longitudinal adjustment to compensate for varying distances between the position of the operating part and the driven part.

My invention is adapted for transmission of power for various purposes, whether the power to be transmitted is derived from hand or mechanical forces. As an example of the use of the invention I have hereinafter described, it is a means for operation of valves.

In cases where the valve proper is to be operated from a distant point and to suit conditions in which the valve is difficult of access or its stem is necessarily out of alinement with the handle or operating part, the handle portion becomes the driving part and the valve stem becomes the driven part and each will be positioned by its own bearings.

My invention also comprehends other features of construction, which, together with those above specified, will be better understood by reference to the drawings, in which:—

Figure 1 is a sectional elevation showing my improvement applied to a valve device; Fig. 2 is a plan view of the same; Fig. 3 is a cross section of the universal joint connecting stem on line $x$—$x$ of Fig. 1; Fig. 4 is a cross section of the same on line $y$—$y$ of Fig. 1; Fig. 5 is a plan view of the socket portion which connects with the valve stem; Fig. 6 is a sectional elevation corresponding to a portion of Fig. 1, but showing a modification; Fig. 7 is a cross section of same on line $z$—$z$ of Fig. 6; and Fig. 8 is a sectional elevation showing a removable hand operated handle or key adapted to my invention.

2 represents the valve proper and may be of any suitable construction whether of the plug valve type, of the usual globe valve type, or of the gate valve construction, the particular form of the valve being immaterial to my invention.

3 is the rotary valve operating stem and it may be adapted to open or close the valve in any suitable manner. Secured to this valve stem is a socket head 4 which is held upon the valve stem by a nut 6 arranged in the bottom of the socket 5. As shown in Figs. 3 and 5, this socket 5 is polygonal shaped and preferably square. Fitting into this square socket 5 is a head portion 8 having a polygonal shaped shank 9. The head portion 8 is polygonal in cross section, as indicated in Fig. 3, it being shaped to correspond to the polygonal socket 5. In the preferred form, it is substantially as if a ball shaped head on the shank 9 were filed or cut away to provide a plurality of flattened portions in its curved surface. In this way, the shank 9 may be adjusted in various positions, as the head 8 and the socket 5 will permit of such adjustments while maintaining their mechanical connection for rotary transmission. Fitting over the shank 9 is a stem 7 which is preferably of tubular metal of polygonal form corresponding to the cross section of the shank 9. This stem 7 may be of any length required to reach from the valve to the distant place where the handle structure is to be arranged. At the distant end, it is fitted with another coupling part, indicated at 10 and 11, the latter being the shank which fits into the stem, and the former being a head portion in all material respects corresponding to the construction of the head portion 8 at the other end of the stem.

12 is a socket head having a polygonal shaped socket 13 corresponding to the socket 5 and in which the polygonal shaped head 10 fits, and by which it is rotated, the said socket head 12 having a stem 14 which is journaled in a plate 15, and connected to an operating handle 18 by the nut 22. The plate 15 is provided with a transverse pin 17 which engages an annular groove 16 in the stem 14 of the socket head, so that the said stem is held in the plate 15 against longitudinal movement. This pin and groove may be omitted if desired. The plate 15 may be provided with two limit stops 23 which stop the rotation of the handle 18 in either direction, namely at the full open or the full shut positions. In this case, a pointer 20 on the handle 18 will be brought in contact with said pins to arrest further movement. The dial plate 15 may also, if desired, have different figures as 1, 2, 3, provided thereon, to indicate different open positions of the valve, for convenience. The part 19 is a wooden extension on the handle, but this may be omitted if so desired.

21 represents a support of any suitable character which may be arranged at a distance from the valve structure 2, and upon which frame the plate 15 is secured. In some cases, this handle structure may be arranged at several feet from the valve structure itself, the length of the connecting stem 7 being varied to suit the particular requirements. It will be understood that when the valve and the handle are located, the tubular connection 7 would be cut to the length desired at the place of installation, and as it is of tubular construction, it is easy for the mechanic to saw off the right length to suit the requirements. In view of the fact that the shanks 9 and 11 are of considerable length, it is evident that the tubular stem 7 connecting them need not be accurately cut as to length, and being of the same shape as the shanks in cross section, the power transmitted from the handle structure to the valve structure will be readily accomplished through the shanks by the rotation produced under the manipulation of the handle.

It will be readily understood that while it is desirable to have the axis of the stem 14 upon which the handle is connected, in alinement with the axis of the valve stem 3, it will be difficult to accurately aline these parts, and in some cases it will be wholly impossible to aline them because of obstacles of construction, and in these cases, it will suffice to put the parts out of alinement, because the universal joint connections formed between the two socket parts 4 and 12 will compensate for any such non-alinement. This is also true whether the plane of the plate 15 is at right angles to the valve stem 3 or inclined thereto. The universal jointed connection permits of any reasonable non-alinement or parallelism of the parts, and is of such simple character that a most ordinary mechanic would be capable of installing the apparatus.

In the modification shown in Figs. 6 and 7, it will be noted that a screw 23ª is provided in the socket head 4, the head of which screw projects over the polygonal head 8 to prevent its unintentional disengagement from the socket 5. To permit a reasonable movement of rocking motion, I prefer to provide a notch 22ª in the side of shank 9 to receive the edge of the screw head when the shank is inclined toward the screw. This same retaining construction may likewise be employed in connection with the upper socket head 12, if so desired. I have described this particular way of retaining the heads within the sockets, but it is evident that the same result may be accomplished in other manners, if so desired.

As shown in Fig. 1, the handle 18 is permanently fastened to the stem 14, but it is evident that the handle proper may be removable so as not to permit the valve to be operated except by the person having the removable handle or key. When this latter construction is desired, it may be provided as in Fig. 8, in which 19 is the removable handle or key and is provided with the socket portion 18ª which fits upon the end of the stem 14, which latter is shielded by a collar 15ª when the handle or key is removed.

It is manifest that while I have shown a suitable construction of extensible joint connection, the details thereof may be greatly modified when used with a valve structure, as, broadly considered, the character of universal joints shown are not essential, and the positions of the sockets and heads might be reversed as will be readily understood. It is also seen that while the end of the power transmitting connection is journaled in the plate 15 and thereby positions the handle or power applying part, the latter may be positioned in any other way, if so desired.

In the foregoing description, I have explained in detail the use of my power transmitting connection for operating valves in which there is a hand rotated part arranged at a distance from the valve and the power of which is to be transmitted to the rotating stem or spindle of the valve, but it is to be understood that this invention, broadly considered, is applicable to any use wherein power is to be transmitted from one rotating part to another rotating part arranged a distance from each other, and which parts may be supported in suitable bearings out of alinement and in which one of said bearings may, if desired, be relatively movable in respect to the other as in the common practice in automobiles, or in any class of machinery where the rotatable parts are supported in fixed bearings or otherwise. It is also to be understood that while the particular example, by way of illustration given in this application, is for transmitting manual power applied to a rotatable handle, the said rotatable part may be driven by any mechanical motor or devices such as is customary in various classes of machinery, and hence while the example is an excellent illustration of the adaptability of my invention in commercial practice, it is not to be taken as a restriction of the invention in its more generic sense.

While in some uses of my invention, the driving and driven parts may have such fixed relation, as to distance apart, that the extensible feature of my improvement would not be specially required, in many forms of apparatus to which this invention is applicable, the driving and driven parts are not only out of alinement but constantly shift their positions so as to vary, to a more or less extent, the distance between the two parts, and in such cases the extensible feature is an important part of the invention.

I have shown my invention by way of illustration in suitable form for use with valve structures more particularly intended for steam heating, but it is to be understood that I do not restrict myself to any particular use of the invention or to the means to be operated, nor to the details of construction of the universal joint extension itself, as these may all be varied or modified to suit any particular purpose or desire of the manufacturer, without departing from the spirit of the invention.

Having now described my invention, what I declare as new and desire to secure by Letters Patent, is:—

The combination of a valve having a valve stem, a head removably secured to said valve stem and provided with a polygonal shaped socket, a polygonal shaped head adapted to fit within said socket, a retaining device for normally preventing removal of said head, a polygonal shaped stem secured to said polygonal head, a support removed from and independent of said valve, a socket member rotatably mounted in said support, said member being provided with a polygonal socket, a manually operable device secured to said socket member for rotating said head, a head of polygonal shape suitably secured within said socket for universal movement, a polygonal stem carried by said last named head and a tube conforming in shape to both said polygonal stems and adapted to receive said stems in telescopic relation, said tube being substantially longer than the combined lengths of said stems whereby the length of the connection between the socket heads may be varied to suit conditions.

In testimony of which invention, I hereunto set my hand.

JOHN A. SERRELL.

Witnesses:
Wm. M. Treadwell,
G. D. Weeks.

Copies of this patent may be obtained for five cents each, by addressing the "Commissioner of Patents, Washington, D. C."